United States Patent
Jodet et al.

(10) Patent No.: US 12,320,316 B2
(45) Date of Patent: Jun. 3, 2025

(54) THRUST REVERSER CASCADE INCLUDING ACOUSTIC TREATMENT

(71) Applicant: SAFRAN AIRCRAFT ENGINES, Paris (FR)

(72) Inventors: Norman Bruno André Jodet, Moissy-Cramayel (FR); Jérémy Paul Francisco Gonzalez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 4 days.

(21) Appl. No.: 17/594,884

(22) PCT Filed: Apr. 3, 2020

(86) PCT No.: PCT/EP2020/059552
§ 371 (c)(1),
(2) Date: Nov. 2, 2021

(87) PCT Pub. No.: WO2020/224886
PCT Pub. Date: Nov. 12, 2020

(65) Prior Publication Data
US 2022/0252021 A1  Aug. 11, 2022

(30) Foreign Application Priority Data
May 3, 2019  (FR) ...................................... 1904653

(51) Int. Cl.
*F02K 1/72*  (2006.01)
*B64D 33/04*  (2006.01)
(Continued)

(52) U.S. Cl.
CPC ................ *F02K 1/72* (2013.01); *B64D 33/06* (2013.01); *F02C 7/24* (2013.01); *F02K 1/827* (2013.01);
(Continued)

(58) Field of Classification Search
CPC ... F02K 1/72; F02K 1/827; F02C 7/24; B64D 33/06; F05D 2220/323; F05D 2260/57; F05D 2260/963; F05D 2260/96
See application file for complete search history.

(56) References Cited

U.S. PATENT DOCUMENTS 11,078,871 B2 * 8/2021 Chilukuri ................. F02K 1/72
2008/0072571 A1 * 3/2008 Beardsley ................ F02K 1/72
60/226.2

(Continued)

FOREIGN PATENT DOCUMENTS

EP  1852595 A2  11/2007
EP  1852595 A3  11/2017
(Continued)

OTHER PUBLICATIONS

French Search Report Issued in FR1904653 on Jan. 14, 2020 (2 pages).

(Continued)

*Primary Examiner* — Andrew H Nguyen
(74) *Attorney, Agent, or Firm* — Bookoff McAndrews, PLLC

(57) ABSTRACT

A cascade for a thrust reverser device intended to be mounted on a turbomachine of an aircraft, the cascade including first partitions extending in a first direction, seconds partitions extending in a second direction orthogonal to the first direction, the second partitions extending in a third direction secant to a plane comprising first and second directions between a first and a second end. Each second partition forms, with reference planes parallel to the second direction and to the third direction, a plurality of different angles at positions distinct from the height of the second partitions separating the first end from the second end of the second partitions, each angle being formed between a reference plane and the tangent to the second partition taken at (Continued)

the intersection between said corresponding reference plane and the second partition at the position of the height of the corresponding second partition.

10 Claims, 3 Drawing Sheets

(51) Int. Cl.
    *F02C 7/24*     (2006.01)
    *F02K 1/82*     (2006.01)

(52) U.S. Cl.
    CPC .. *F05D 2220/323* (2013.01); *F05D 2240/129* (2013.01); *F05D 2250/71* (2013.01); *F05D 2260/96* (2013.01)

(56) References Cited

U.S. PATENT DOCUMENTS

| | | | | |
|---|---|---|---|---|
| 2013/0092755 | A1* | 4/2013 | Aten | F02K 1/72 239/265.33 |
| 2015/0285184 | A1 | 10/2015 | Sawyers-Abbott | |
| 2016/0263820 | A1* | 9/2016 | Kruckenberg | F02K 1/64 |
| 2016/0273488 | A1* | 9/2016 | Whitaker | F02K 1/625 |
| 2016/0326985 | A1* | 11/2016 | Hercock | F02K 1/625 |
| 2017/0058829 | A1* | 3/2017 | Dong | F02K 1/605 |
| 2017/0204809 | A1* | 7/2017 | Smith | F01D 25/28 |
| 2020/0025138 | A1* | 1/2020 | Bourdeau | F02K 1/72 |
| 2020/0095955 | A1* | 3/2020 | Davis | B29C 43/36 |
| 2020/0386184 | A1* | 12/2020 | Boileau | F02K 1/827 |

FOREIGN PATENT DOCUMENTS

| | | |
|---|---|---|
| EP | 3406887 A1 | 11/2018 |
| WO | 2019002753 A1 | 1/2019 |

OTHER PUBLICATIONS

International Search Report issued in PCT/EP2020/059552 on May 15, 2020 with English Translation (5 pages).
Written Opinion of the International Searching Authority issued in PCT/EP2020/059552 (6 Pages).

* cited by examiner

[Fig. 3]
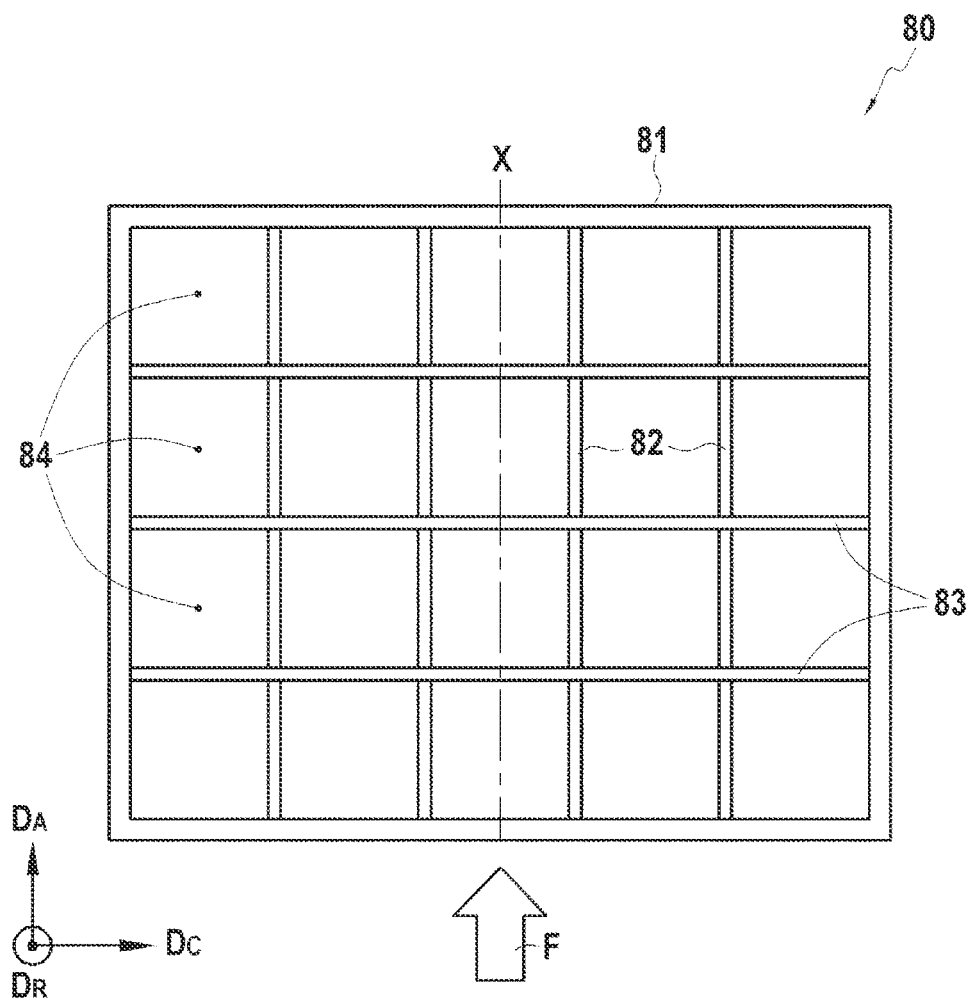

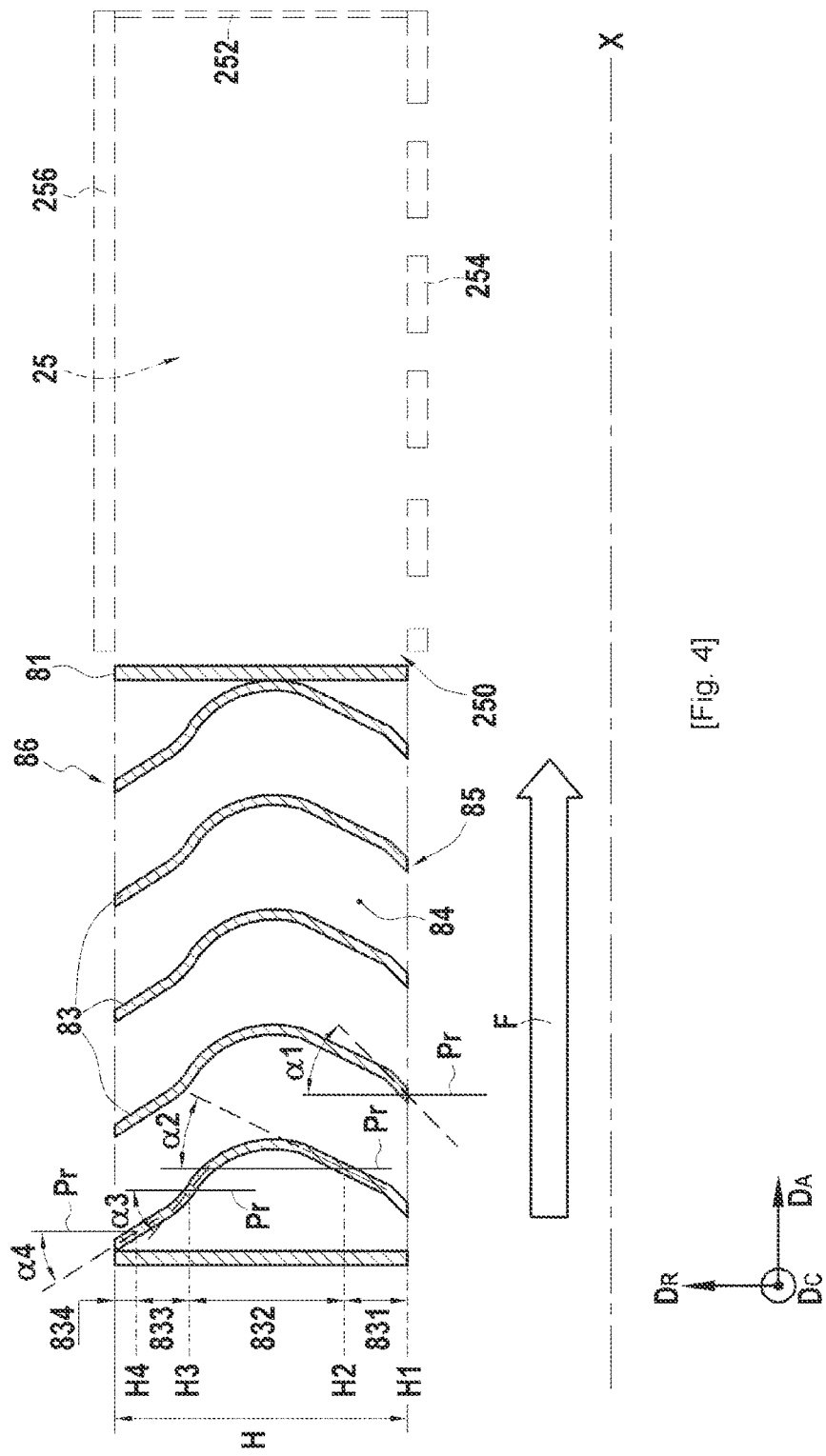

THRUST REVERSER CASCADE INCLUDING ACOUSTIC TREATMENT

CROSS-REFERENCE TO RELATED APPLICATIONS

This patent application is the U.S. National Stage entry under 35 U.S.C. § 371 of International Patent Application No. PCT/EP2020/059552, filed on Apr. 3, 2020, which claims the benefit of priority to French Patent Application No. 1904653, filed on May 3, 2019.

TECHNICAL FIELD

The invention relates to the acoustic treatment of sound waves emitted by a turbomachine of an aircraft, and more particularly to the treatment of sound waves at the thrust reversers of the turbomachine.

PRIOR ART

When a turbomachine is in operation, the interaction between the flow and the solid parts of the turbomachine is responsible for the generation of noises that propagate through the turbomachine.

One of the ways to attenuate this acoustic radiation is to integrate acoustic treatment means at the surfaces in contact with the sound waves.

Conventionally, the acoustic treatment of a turbojet engine, and more specifically of the noise radiated by the interaction between the rotor and its environment, is made using sound-absorbing panels disposed at the wetted surfaces of the duct in which the sound waves propagate. By wetted surfaces is meant the surfaces in contact with a fluid flow. These panels are generally sandwich-type composite materials trapping a honeycomb forming sound absorption cells.

Acoustic panels with a single degree of freedom, or SDOF, are known for example in the state of the art, which have a conventional honeycomb structure of acoustic treatment panels covering the walls of the nacelle of a turbomachine.

Due to the operating principle of the acoustic treatment panel technologies using resonant cavities, the radial space requirement, that is to say the radial thickness, of the acoustic treatment panels depends on the targeted treatment frequency to obtain a maximum efficiency in terms of acoustic attenuation.

However, engine architectures show increasingly slower rotational speeds of the bladed wheels and an increasingly smaller number of blades on the bladed wheels, resulting in reduced dominant frequencies of the noise associated with the module comprising the fan and the rectifier stage or fan-OGV (Outlet Guide Vane) module. As a result, the match between the optimum thickness of the acoustic panels and the space requirement available in the nacelles is currently not met.

To slow down an aircraft, a turbomachine generally comprises thrust reversers. There are mainly two thrust reverser technologies which are based on the action of a cascade. There are two types of cascade-type thrust reversers: the fixed-cascade thrust reversers and the slidably engaged-cascade thrust reversers.

FIGS. 1a and 1b represent schematic sectional views in a longitudinal plane of a turbomachine 1 according to a first embodiment known in the state of the art respectively in an inactivated thrust reversal position and in an activated thrust reversal position.

The turbomachine 1 comprises a nacelle 2 with symmetry of revolution about an axis X defining an axial direction $D_A$, a radial direction $D_R$ and a circumferential direction $D_C$, a fan 3, a primary flowpath 4, a secondary flowpath, a primary rectifier stage 5, a secondary rectifier stage 6, and a cascade thrust reverser device 7 including a cascade 8.

As illustrated in FIGS. 1A and 1B which represent a turbomachine provided with a fixed-cascade thrust reverser, in the fixed-cascade thrust reversers, the cascade 8 is embedded with, that is to say secured to, an upstream part 21 of the nacelle 2 and slidably engaged with a downstream part 22 of the nacelle 2, the upstream and the downstream being defined relative to the direction of flow of a gas stream F in the turbomachine 1. By translating downstream, the downstream part 22 of the nacelle 2 uncovers the cascade 8 which becomes the only interface between the flow inside the nacelle 2 and the ambient environment in which the turbomachine 1 operates.

FIGS. 2a and 2b represent schematic sectional views in a longitudinal plane of a turbomachine 1 according to a second embodiment known in the state of the art respectively in an inactive thrust reversal position and in an activated thrust reversal position.

As illustrated in FIGS. 2A and 2B which represent a turbomachine 1 provided with a slidably engaged-cascade thrust reverser, in the fixed-cascade thrust reversers, the cascade 8 is slidably engaged relative to the upstream part 21 of the nacelle 2 and in embedded connection relative to the downstream part 22 of the nacelle 2. By translating downstream, the downstream part 22 of the nacelle 2 drives the cascade 8 out of the nacelle 2 to position it at the interface between the flow inside the nacelle 2 and the ambient environment.

The thrust reversers represent at the same time a cost, a mass and a space requirement which are very detrimental to the performance of the propulsion unit, while they are used only at the end of the landing phase. In particular, the volume they use in the nacelle cannot be used, in the state of the art, for the acoustic treatment of the sound waves emitted by the turbomachine.

In the propulsion unit architectures using door-type thrust reversers which deploy inside the secondary stream to divert the flow upstream outside the nacelle, a known practice of integrating a conventional acoustic treatment consists in integrating acoustic panels in cavities of the reverser doors. This practice simply consists in integrating conventional sound-absorbing panels into the available volumes, as is done in the fan casing.

DISCLOSURE OF THE INVENTION

The invention aims to provide a cascade of a cascade-type thrust reverser which allows, when the cascade is mounted in a thrust reverser of a turbomachine, at the same time reorienting an air stream towards the upstream of the turbomachine outside the nacelle, minimizing the pressure drops through the cascade and maximizing the sound absorption efficiency.

One object of the invention proposes a cascade for a thrust reverser device intended to be mounted on a turbomachine of an aircraft, the cascade including first partitions extending in a first direction, second partitions extending in a second direction orthogonal to the first direction, the second partitions extending between a first and a second end in a third direction orthogonal to the first and second directions, and at least part of each second partition extending between two first partitions in a plane comprising the first and second directions.

According to a general characteristic of the invention, each second partition forms, with reference planes parallel to the second direction and to the third direction, a plurality of different angles at positions distinct from the height of the second partitions separating the first end from the second end of the second partitions, each angle being formed between a reference plane and the tangent to the second partition taken at the intersection between said corresponding reference plane and the second partition, at the position of the height of the corresponding second partition.

The second partitions are intended to be oriented along a direction orthogonal to the direction of flow of a gas stream inside a turbomachine including a thrust reverser device provided with such a cascade. When the cascade is mounted on a thrust reverser device on a turbomachine, the second partitions, oriented along an azimuthal or radial direction of the turbomachine, are essential to ensure the thrust reversal functionality. It is indeed thanks to these second partitions that the air stream circulating in a flowpath, inside the nacelle in which the thrust reverser device is mounted, can be captured and reoriented towards the upstream of the turbomachine, relative to the direction of flow of the stream inside the nacelle, outside the nacelle.

The first partitions are intended to be oriented along the direction of the gas stream inside a turbomachine including a thrust reverser device provided with such a cascade. When the cascade is mounted on a thrust reverser device on a turbomachine, the first partitions, oriented along an axial direction of the turbomachine, are not essential for the thrust reversal functionality. On the other hand, they allow obtaining cavities that allow attenuating the acoustic waves generated by the turbomachine.

The conformation of the second partitions allows both promoting the acoustic propagation in plane waves at the entrance to the resonant cavities, by avoiding the phenomena of wave reflection on the reverser partitions, and capturing the aerodynamic flow when the thrust reverser is activated to reorient it towards the upstream and outside the nacelle when the cascade is mounted on a turbomachine.

In a first aspect of the cascade, the distance between two first partitions along the second direction can correspond to the distance between two second partitions along the first direction.

Such an arrangement allows obtaining substantially square meshes and thus promoting the acoustic propagation in plane waves inside the cavities.

In a second aspect of the cascade, the second partitions may comprise a first angle comprised between 0° and 40° and formed at a first position of said height of the second partitions, the first position being comprised between 0% and 20% of said height measured from the first end to the second end.

This first angle is intended to orient a first portion of the second partition downstream when the cascade is mounted in a thrust reverser device disposed in a turbomachine through which an air stream passes from the upstream of the turbomachine towards the downstream of the turbomachine.

This first angle is formed at the entrance to the resonant cavity that is to say at a position of the height of the second partition closest to the flow of gas stream inside the nacelle when the cascade is mounted on a turbomachine. This first angle allows promoting the acoustic propagation in plane waves at the entrance to the resonant cavities, by avoiding the phenomena of wave reflections on the reverser partitions.

In a third aspect of the cascade, the second partitions may comprise a second angle comprised between 20° and 60° and formed between the first position and the second end at a second position of said height of the second partitions comprised between 5% and 60% of said height measured from the first end.

This second angle is intended to orient a second portion of the second partition downstream when the cascade is mounted in a thrust reverser device disposed in a turbomachine through which an air stream passes.

This second angle, formed at a second position of the height of the second partition further from the gas stream circulating inside the nacelle than the first angle, allows properly capturing the aerodynamic flow when the thrust reverser is activated.

In a fourth aspect of the cascade, the second partitions may comprise a third angle comprised between −20° and −70° and formed between the second position and the second end at a third position of said height of the second partitions comprised between 45% and 95% of said height measured from the first end.

This third angle is intended to orient a third portion of the second partition upstream when the cascade is mounted in a thrust reverser device disposed in a turbomachine through which an air stream passes.

This third angle formed at a third position of the height of the second partition further from the gas stream circulating inside the nacelle than the second angle, allows reorienting the aerodynamic flow towards the upstream of the turbomachine outside the nacelle, when the thrust reverser is in the open position.

In a fifth aspect of the cascade, the second partitions may comprise a fourth angle comprised between −45° and 0° and formed between the third position of the third angle and the second end at a fourth position of said height of the second partitions comprised between 10% and 100% of said height measured from the first end.

This fourth angle is intended to orient a fourth portion of the second partition upstream when the cascade is mounted in a thrust reverser device disposed in a turbomachine through which an air stream passes.

This fourth angle formed at a fourth position of the height of the second partition further from the gas stream circulating inside the nacelle than the third angle, allows optimizing the reflection of the acoustic waves at the bottom of the resonant cavity when the thrust reverser is not activated and when the cascade has entered the nacelle, in its housing between a perforated wall in contact with the inner gas stream and a reflecting wall radially external relative to the perforated wall.

In a sixth aspect of the cascade, the second partitions may comprise height portions extending between each end and the adjacent position of the height of the second partitions, and between two successive positions of the height of the second partitions, two adjacent portions being connected by transitions with radii of curvature greater than 1 mm.

The connection of the different portions of the second partitions with radii of curvature greater than 1 mm allows obtaining progressive transitions promoting efficient guidance of the acoustic waves.

In a seventh aspect of the cascade, the height of the second partitions can be comprised between 10 mm and 300 mm and the thickness of the second partitions can be comprised between 0.5 mm and 5 mm to be thick enough to hold the load cases to which they are subjected, but also as thin as possible to minimize the mass and the pressure drops in the cascade. The thickness of the second partitions is measured at a given point of the second partition, perpendicularly to the tangent to the surface at that point of the second partition.

In another object of the invention, a cascade thrust reverser device for a turbomachine of an aircraft is proposed, characterized in that it comprises at least one cascade as defined above.

In yet another object of the invention, a turbomachine intended to be mounted on an aircraft is proposed, the turbomachine comprising a nacelle with symmetry of revolution defining an axial direction and a radial direction, the nacelle including a thickness along the radial direction and a housing extending along the axial direction in its thickness to receive a cascade of a cascade thrust reverser device.

According to a general characteristic of this object of the invention, the turbomachine may comprise a cascade thrust reverser device as defined above, the cascade being disposed, when the thrust reversal is not required, in the corresponding housing of the nacelle of the turbomachine with the first partitions extending along the axial direction and the radial direction and the second partitions extending along the radial direction and along a direction orthogonal to the axial direction and to the radial direction, the first direction corresponding to the axial direction.

In one embodiment of the turbomachine, the nacelle may comprise a perforated wall forming a radially internal wall of the housing and a reflecting wall forming a radially external wall of the housing.

In another object of the invention, an aircraft comprising at least one turbomachine as defined above is proposed.

BRIEF DESCRIPTION OF THE DRAWINGS

The invention will be better understood upon reading the following, by way of indication but without limitation, with reference to the appended drawings in which:

FIG. 3 shows a schematic sectional view along a plane comprising the axial direction and orthogonal to the radial direction of a cascade of a thrust reverser device for a turbomachine according to one embodiment of the invention.

FIG. 4 shows a schematic sectional view along a plane comprising the axial direction and the radial direction of a cascade of a thrust reverser device for a turbomachine according to one embodiment of the invention.

DESCRIPTION OF THE EMBODIMENTS

FIGS. 3 and 4 represent respectively a first schematic sectional view and a second schematic sectional view of a cascade of a thrust reverser device for a turbomachine of an aircraft according to one embodiment of the invention.

Figure 1A:
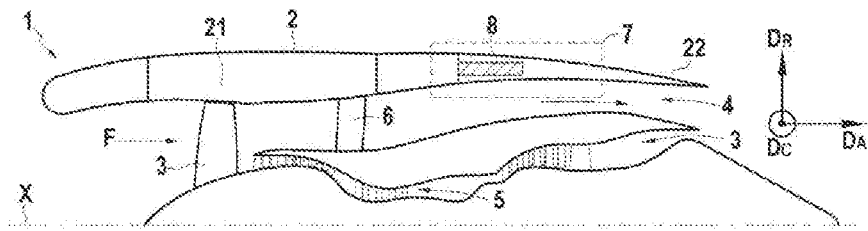
FIGS. 1A and 1B, already described, show schematic sectional views in a longitudinal plane of a turbomachine according to a first embodiment known in the state of the art respectively in an inactive thrust reversal position and in an activated thrust reversal position.
Figure 1B:
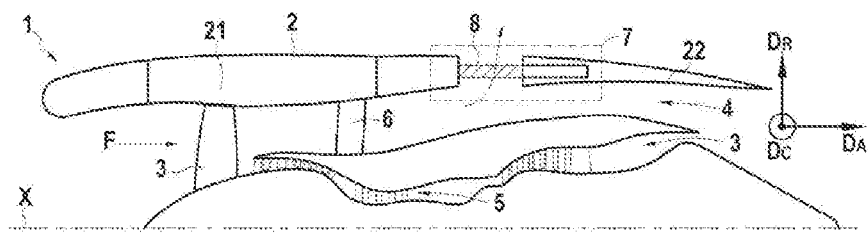
Figure 2A:
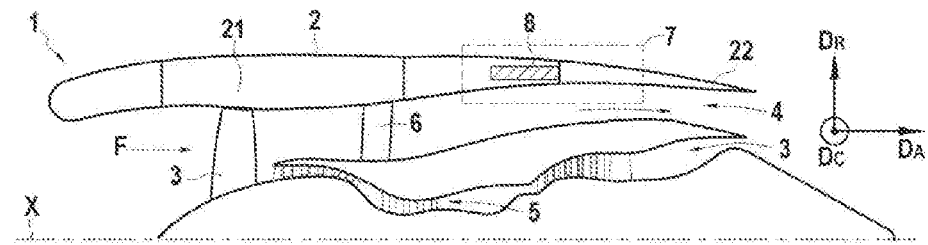
FIGS. 2A and 2B, already described, show schematic sectional views in a longitudinal plane of a turbomachine according to a second embodiment known in the state of the art, respectively in an inactive thrust reversal position and in an activated thrust reversal position.
Figure 2B:
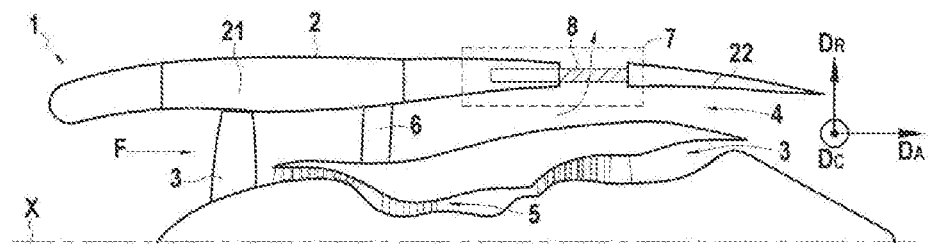

The turbomachine comprises a thrust reverser device which can operate according to the operation described in FIGS. 1A and 1B or according to the operation described in FIGS. 2A and 2B.

The thrust reverser device comprises a plurality of cascades 80 assembled to form a mesh crown. Each cascade 80 comprises a frame 81 within which first partitions 82 extend in a first direction and second partitions 83 extend in a second direction orthogonal to the first direction. The frame 81 and the first and second partitions 82 and 83 have a height H in a third direction orthogonal to the first and second directions comprised between 10 mm and 300 mm.

The thickness of the second partitions 83 comprised between 0.5 mm and 5 mm to be thick enough to withstand the load cases to which they are subjected, but also as thin as possible to minimize the mass and the pressure drops in the cascade.

FIG. 3 is a schematic sectional view in a first sectional plane comprising said first and second directions.

FIG. 4 is a schematic sectional view in a second sectional plane comprising said first and third directions.

When the thrust reverser device is mounted on a turbomachine such as those illustrated in FIGS. 1a, 1b, 2a, 2b, the first direction corresponds to the axial direction $D_A$ of the turbomachine 1, the second direction corresponds to the circumferential direction $D_C$ of the turbomachine 1, and the third direction corresponds to the radial direction $D_R$ of the turbomachine 1.

The second partitions 83 are azimuthal partitions intended to orient the gas stream F outwardly of the nacelle 2 and upstream of the turbomachine for the thrust reversal when the thrust reverser device is activated. The first partitions 82 are axial partitions intended to define, with the second partitions 83, resonant cavities 84 for the absorption of the acoustic waves generated by the turbomachine, when the thrust reverser device is inactive.

The distance in the second direction, that is to say in the circumferential direction $D_C$, separating two adjacent first partitions 82 from each other is equal to the distance in the first direction, that is to say in the axial direction $D_A$, separating two second partitions 83, thus promoting the acoustic propagation in plane waves inside the cavities.

As illustrated in FIG. 4, the second partitions 83 are not planar along the third direction that is to say in the radial direction $D_R$. The second partitions 83 have a complex shape with, in the embodiment illustrated in FIG. 4, four non-zero angles with reference planes Pr parallel to the radial $D_R$ and circumferential $D_C$ directions, in other words with planes orthogonal to the axial direction $D_A$. Each angle is measured between a reference plane Pr and the tangent to the second partition 83 taken at the intersection between the corresponding reference plane Pr and the second partition 82 at the position of the height of the corresponding second partition. The angle is measured between an angle from −180° to +180° on either side of the corresponding reference plane Pr. A zero angle corresponding to a tangent extending in the reference plane Pr. A negative angle corresponds to a tangent oriented towards the upstream of the turbomachine 1 in which the thrust reverser device is mounted, a positive angle corresponds to a tangent oriented downstream.

FIG. 4 represents the axis of rotation X of the turbomachine 1. The second partitions 83 extend between a first end 85 facing the axis of rotation X and a second end 86 opposite to the first end 85 and intended to be oriented outwardly of the nacelle 2.

FIG. 4 illustrates the cascade in an active position of the thrust reverser that is to say in a position where the cascade 80 has left a housing 25 provided in the thickness of the nacelle 2 to receive the cascade 80 when the thrust reverser is inactive. The housing 25 comprises an opening 250 allowing the insertion of the cascade 80 in the housing 25 along the axial direction $D_A$, a bottom wall 252 extending in the radial direction $D_R$ opposite the opening 250, a perforated wall 254 and a reflecting wall 256 parallel to each other and extending in the axial direction $D_A$ and in the circumferential direction $D_C$, the perforated wall 254 being radially inside the reflecting wall 256. The perforated and reflecting walls 254 and 256 thus allow, when the cascade is inserted in the housing, forming resonant cavities of the Helmholtz resonator type provided with a volume and a neck formed by each of the openings of the perforated wall 254.

The height H of the nacelle is measured from the first end 85 to the second end 86. In the following, a different height H level will be distinguished as a percentage of the height of the second partitions 83. The more the position is given with a low height percentage, the closer the position is to the first end 85. The higher the percentage, the closer the position is to the second end.

As illustrated in FIG. 4, each second partition comprises a first angle α1 comprised between 0° and 40° oriented downstream, for example 40° in FIG. 4, and formed at a first position H1 of the height H comprised between 0% and 20%, for example 0% in FIG. 4, that is to say at the first end 85. This first angle α1 formed at the entrance to the resonant cavity promotes the acoustic propagation in plane waves at the entrance to the resonant cavities 84, avoiding the phenomena of wave reflections on the second reverser partitions 83.

Each second partition 83 comprises a second angle α2 comprised between 20° and 60° also oriented downstream, for example 20° in FIG. 4, and formed between the first position H1 and the second end 86 at a second position H2 of the height H comprised between 5% and 60%, for example 35% in FIG. 4. This second angle α2 formed at a second position H2 allows properly capturing the aerodynamic flow when the thrust reverser is activated.

Each second partition 83 comprises a third angle α3 comprised between −20° and −70° oriented upstream, for example −50° in FIG. 4, and formed between the second position H2 and the second end 86 at a third position H3 of the height H comprised between 45% and 95%, for example 60% in FIG. 4. This third angle α3 formed at a third position H3 reorients the aerodynamic flow F towards the upstream of the turbomachine 1 outside the nacelle 2, when the thrust reverser is in the open position.

Each partition 83 comprises a fourth angle α4 comprised between −45° and 0° oriented upstream, for example −20° in FIG. 4, and formed between the third position H3 of the third angle α3 and the second end 86 at a fourth position H4 of the height H comprised between 10% and 100%, for example 90% in FIG. 4. This fourth angle α4 formed at a fourth position H4 of the height H optimizes the reflection of the acoustic waves at the bottom of the resonant cavity 84 when the thrust reverser is not activated and when the cascade 80 has entered the nacelle 2, in its housing 25 between the perforated wall 254 in contact with the inner gas stream F and the reflecting wall 256 radially external relative to the perforated wall 254.

Each second partition 83 thus comprises height portions 831 to 834 extending between an end 85 or 86 and a position of height H1 to H4 not coincident with an end 85 or 86, and between two adjacent positions of height H1 to H4. The first portion 831 extends between the first end 85 and the second position H2. The second portion 832 extends between the second position H2 and the third position H3. The third portion 833 extends between the third position H3 and the fourth position H4. The fourth portion 834 extends between the fourth height H4 and the second end 86. Two adjacent portions are connected by transitions having radii of curvature greater than 1 mm to obtain progressive transitions promoting efficient guidance of the acoustic waves.

The invention thus provides a cascade of a cascade-type thrust reverser which allows, when the cascade is mounted in a thrust reverser of a turbomachine, at the same time reorienting an air stream towards the upstream of the turbomachine outside the nacelle, minimizing the pressure drops through the cascade and maximizing the sound absorption efficiency.

The invention claimed is:

1. A turbomachine intended to be mounted on an aircraft, the turbomachine comprising a cascade thrust reverser device and a nacelle with symmetry of revolution defining an axial direction and a radial direction, the nacelle including a thickness along the radial direction and a housing extending along the axial direction in its thickness to receive a cascade of the cascade thrust reverser device, the cascade thrust reverser device comprising the cascade including first partitions extending in a first direction, second partitions extending in a second direction orthogonal to the first direction, the second partitions extending between a first and a second end in a third direction crossing a plane comprising the first and second directions, and at least part of each second partition extending between two of the first partitions, wherein each second partition forms, with reference planes parallel to the second direction and to the third direction, a plurality of different angles at a plurality of distinct positions of a height of the second partitions separating the first end from the second end of the second partitions, each angle being formed between a corresponding one of the reference planes and a tangent to the second partition taken at a intersection between a corresponding one of the reference planes and the second partition, at the position of the height of the corresponding second partition, wherein the nacelle comprises a perforated wall forming a radially internal wall of the housing and a reflecting wall forming a radially external wall of the housing, the cascade being disposed, when a thrust reversal is not required, in the housing of the nacelle of the turbomachine with the first partitions extending along the axial direction and the radial direction and the second partitions extending along the radial direction and along a direction orthogonal to the axial direction and to the radial direction, the first direction corresponding to the axial direction, wherein the second partitions comprise a first angle formed at a first position of the plurality of positions of said height of the second partitions comprised between 0% and 20% of said height measured from the first end to the second end, wherein the second partitions comprise a second angle of the plurality of angles formed between the first position of the plurality of positions and the second end at a second position of the plurality of positions of said height of the second partitions comprised between 5% and 60% measured from the first end, wherein the second partitions comprise a third angle of the plurality of angles formed between the second position of the plurality of positions and the second end at a third position of the plurality of positions of said height of the second partitions comprised between 45% and 95% of said height measured from the first end, wherein a fourth angle of the plurality of angles is formed between the third position of the plurality of positions and the second end at a fourth position of the plurality of positions of said height of the second partitions comprised between 10% and 100% of said height measured from the first end, and wherein a slope of the second partition at the fourth position of the plurality of positions is greater than the slope of the second partition at the third position of the plurality of positions, and wherein the second partitions comprise an upstream face, said upstream face defining a concave portion and a convex portion; and wherein the first angle, the second angle, the third angle, and the fourth angle form the concave portion and the convex portion, and wherein the convex portion is positioned at about 60% of said height.

2. The turbomachine according to claim 1, wherein a distance between two of the first partitions along the second direction corresponds, at least, to half the distance between two of the second partitions along the first direction, and at most, twice the distance between said two of the second partitions along the first direction.

3. The turbomachine according to claim 1, wherein the second partitions comprise the first angle of the plurality of angles comprised between 0° and 40° and formed at the first position of the plurality of positions of said height of the second partitions comprised between 0% and 20% of said height measured from the first end to the second end.

4. The turbomachine according to claim 3, wherein the second partitions comprise the second angle of the plurality of angles comprised between 20° and 60° and formed between the first position of the plurality of positions and the second end at the second position of the plurality of positions of said height of the second partitions comprised between 5% and 60% of said height measured from the first end.

5. The turbomachine according to claim 4, wherein the second partitions comprise the third angle of the plurality of angles comprised between −20° and −70° and formed between the second position of the plurality of positions and the second end at the third position of the plurality of positions of said height of the second partitions comprised between 45% and 95% of said height measured from the first end.

6. The turbomachine according to claim 1, wherein the second partitions comprise the fourth angle of the plurality of angles comprised between −45° and 0° and formed between the third position of the plurality of positions and the second end at the fourth position of the plurality of positions of said height of the second partitions comprised between 10% and 100% of said height measured from the first end.

7. The turbomachine according to claim 1, wherein the second partitions comprise height portions extending between the first end and second end of the second partitions and an adjacent position of the height of the second partitions, and between the first position of the plurality of positions and the second position of the plurality of positions, or the second position of the plurality of positions and the third position of the plurality of positions, or the third position of the plurality of positions and the fourth position of the plurality of positions of the height of the second partitions, two adjacent portions being connected by transitions with radii of curvature greater than 1 mm.

8. The turbomachine according to claim 1, wherein the height of the second partitions is comprised between 10 mm and 300 mm and the thickness of the second partitions is comprised between 0.5 mm and 5 mm.

9. An aircraft comprising at least one turbomachine according to claim 1.

10. The turbomachine according to claim 1, wherein the cascade includes a frame within which the first partitions extend in the first direction and the second partitions extend in the second direction.

* * * * *